United States Patent
Dani et al.

(10) Patent No.: US 10,765,973 B2
(45) Date of Patent: Sep. 8, 2020

(54) FILTER CORE CONFIGURATION

(71) Applicant: Brita LP, Oakland, CA (US)

(72) Inventors: Nikhil P. Dani, Pleasanton, CA (US); Russell Bell, Pleasanton, CA (US)

(73) Assignee: BRITA LP, Oakland, CA (US)

( * ) Notice: Subject to any disclaimer, the term of this patent is extended or adjusted under 35 U.S.C. 154(b) by 89 days.

(21) Appl. No.: 15/756,747

(22) PCT Filed: Sep. 27, 2016

(86) PCT No.: PCT/IB2016/001495
§ 371 (c)(1),
(2) Date: Mar. 1, 2018

(87) PCT Pub. No.: WO2017/055918
PCT Pub. Date: Apr. 6, 2017

(65) Prior Publication Data
US 2018/0250615 A1    Sep. 6, 2018

Related U.S. Application Data

(60) Provisional application No. 62/235,295, filed on Sep. 30, 2015.

(51) Int. Cl.
*B01D 27/08* (2006.01)
*B01D 29/21* (2006.01)
(Continued)

(52) U.S. Cl.
CPC ............ *B01D 27/08* (2013.01); *B01D 29/111* (2013.01); *B01D 29/216* (2013.01); *B01D 29/96* (2013.01);
(Continued)

(58) Field of Classification Search
CPC ...... B01D 27/08; B01D 29/216; B01D 29/96; B01D 29/111; B01D 2201/0415; B01D 2201/291; C02F 1/003; C02F 2307/04
See application file for complete search history.

(56) References Cited

U.S. PATENT DOCUMENTS

| 313,320 A | 3/1885 | Goodale |
| 619,569 A | 2/1899 | Hewel |

(Continued)

FOREIGN PATENT DOCUMENTS

| CA | 2051056 C | 9/1998 |
| CA | 2559637 A1 | 3/2007 |

(Continued)

OTHER PUBLICATIONS

CamelBak: "CamelBak Relay Water Pitcher," published Jan. 22, 2014, p. 1, XP054977371. Retrieved from Internet URL: https://www.youtube.com/watch?v=01TdZCF8AgY [retrieved on May 18, 2017].

(Continued)

*Primary Examiner* — Krishnan S Menon
*Assistant Examiner* — Waqaas Ali
(74) *Attorney, Agent, or Firm* — Thomas C. Feix (57) ABSTRACT

In one example, a filter core includes a body with a generally cylindrical shape and a substantially hollow interior. The body includes a first annular wall disposed proximate a first end of the body, and a second annular wall disposed proximate a second end of the body such that the second annular wall is axially spaced apart from the first annular wall, and the second annular wall and the first annular wall extend toward each other. As well, the filter core includes a framework connected to the first annular wall and the second annular wall. The framework and the first and second annular walls cooperate with each other to define a group of (Continued)

openings, each of which communicates with the substantially hollow interior of the body, and the openings collectively define an open space of the filter core.

19 Claims, 10 Drawing Sheets

(51) Int. Cl.
    *C02F 1/00*             (2006.01)
    *B01D 29/11*          (2006.01)
    *B01D 29/96*          (2006.01)

(52) U.S. Cl.
    CPC ...... *C02F 1/003* (2013.01); *B01D 2201/0415* (2013.01); *B01D 2201/291* (2013.01); *C02F 2307/04* (2013.01)

(56) References Cited

U.S. PATENT DOCUMENTS

| | | |
|---|---|---|
| 1,074,168 A | 9/1913 | Feinstein |
| 2,689,048 A | 9/1954 | Powers |
| 3,016,984 A | 1/1962 | Getzin |
| 3,497,069 A | 2/1970 | Lindenthal et al. |
| 3,535,852 A | 10/1970 | Hirs |
| 3,554,377 A | 1/1971 | Miller |
| 3,662,780 A | 5/1972 | Marsh |
| 4,066,551 A | 1/1978 | Stern |
| 4,096,742 A | 6/1978 | Musolf et al. |
| 4,154,688 A | 5/1979 | Pall |
| 4,259,096 A | 3/1981 | Nakamura et al. |
| 4,605,499 A | 8/1986 | Wise |
| 4,696,742 A | 9/1987 | Shimazaki |
| 4,764,274 A | 8/1988 | Miller |
| 4,921,600 A | 5/1990 | Meissner |
| 4,948,499 A | 8/1990 | Peranio |
| 4,983,288 A | 1/1991 | Karbachsch et al. |
| 5,061,367 A | 10/1991 | Hatch et al. |
| 5,076,922 A | 12/1991 | DeAre |
| 5,102,541 A * | 4/1992 | Breitbach ............ B01D 29/41 210/232 |
| 5,106,501 A | 4/1992 | Yang et al. |
| 5,122,270 A | 6/1992 | Ruger et al. |
| 5,202,183 A | 4/1993 | Hosako et al. |
| 5,225,078 A | 7/1993 | Polasky et al. |
| 5,595,659 A | 1/1997 | Huang et al. |
| 5,609,759 A | 3/1997 | Nohren, Jr. et al. |
| 5,681,463 A | 10/1997 | Shimizu et al. |
| 5,736,045 A | 4/1998 | Bies et al. |
| 5,897,779 A * | 4/1999 | Wisted .................. B01D 15/22 210/321.74 |
| 5,904,854 A | 5/1999 | Shmidt et al. |
| 5,919,365 A | 7/1999 | Collette |
| 5,980,743 A | 11/1999 | Bairischer |
| 6,004,460 A | 12/1999 | Palmer et al. |
| 6,189,436 B1 | 2/2001 | Brooks |
| 6,193,886 B1 | 2/2001 | Nohren, Jr. |
| 6,368,506 B1 | 4/2002 | Gebert et al. |
| 6,383,381 B1 | 5/2002 | O'Flynn et al. |
| 6,435,209 B1 | 8/2002 | Heil |
| 6,565,743 B1 | 5/2003 | Poirier et al. |
| 6,569,329 B1 | 5/2003 | Nohren, Jr. |
| 6,589,904 B1 | 7/2003 | Iwasaki et al. |
| 6,599,427 B2 | 7/2003 | Nohren et al. |
| 6,733,669 B1 | 5/2004 | Crick |
| 7,473,362 B1 | 1/2009 | Nohren, Jr. |
| 7,828,969 B2 | 11/2010 | Eaton et al. |
| 8,051,989 B1 | 11/2011 | Tondreau |
| 8,080,160 B2 | 12/2011 | Yanou et al. |
| 8,133,525 B2 | 3/2012 | Skalski et al. |
| 8,419,818 B2 | 4/2013 | Page |
| 9,511,315 B2 | 12/2016 | Cur et al. |
| 10,035,713 B2 | 7/2018 | Dani et al. |
| 2001/0035094 A1 | 11/2001 | Takagaki et al. |
| 2002/0020673 A1 | 2/2002 | Nohren et al. |
| 2002/0060176 A1 | 5/2002 | Mierau et al. |
| 2002/0066700 A1 | 6/2002 | Dolfel et al. |
| 2002/0083841 A1 | 7/2002 | Chaouachi et al. |
| 2002/0166811 A1 | 11/2002 | Walker et al. |
| 2005/0279768 A1 | 12/2005 | Chatrath |
| 2006/0144781 A1 | 7/2006 | Carlson et al. |
| 2007/0007296 A1 | 1/2007 | Guyot |
| 2007/0095758 A1 | 5/2007 | Bortun et al. |
| 2008/0128364 A1 | 6/2008 | Cloud et al. |
| 2008/0274312 A1 | 11/2008 | Schelling et al. |
| 2009/0039028 A1 | 2/2009 | Eaton et al. |
| 2009/0139926 A1 | 6/2009 | Hassebrauck |
| 2009/0184042 A1 | 7/2009 | Steed et al. |
| 2010/0170839 A1 | 7/2010 | Kohl |
| 2010/0219151 A1 | 9/2010 | Risheq |
| 2010/0266351 A1 | 10/2010 | Vogel et al. |
| 2010/0282682 A1 | 11/2010 | Eaton et al. |
| 2011/0079551 A1 | 4/2011 | Olson et al. |
| 2011/0079572 A1 | 4/2011 | Olson et al. |
| 2011/0247975 A1 | 10/2011 | Rapparini |
| 2011/0278216 A1 | 11/2011 | Hull et al. |
| 2011/0303589 A1 | 12/2011 | Kuennen et al. |
| 2011/0305801 A1 | 12/2011 | Beer |
| 2012/0017766 A1 | 1/2012 | Anson et al. |
| 2012/0055862 A1 | 3/2012 | Parekh et al. |
| 2012/0061312 A1 | 3/2012 | Busick et al. |
| 2012/0187036 A1 | 7/2012 | Risheq |
| 2012/0193282 A1 | 8/2012 | Wolf et al. |
| 2012/0214375 A1 | 8/2012 | Kitano et al. |
| 2012/0255890 A1 | 10/2012 | Cumberland |
| 2012/0292247 A1 | 11/2012 | Moon et al. |
| 2012/0298570 A1 * | 11/2012 | Osawa ................. B01D 25/24 210/202 |
| 2012/0298614 A1 | 11/2012 | Nelson |
| 2012/0325735 A1 | 12/2012 | Dicks et al. |
| 2013/0037481 A1 | 2/2013 | Lalouch et al. |
| 2013/0045252 A1 | 2/2013 | Rawlings et al. |
| 2013/0095212 A1 | 4/2013 | Beer |
| 2013/0125748 A1 | 5/2013 | Taylor et al. |
| 2013/0156897 A1 | 6/2013 | Goldstein |
| 2013/0175228 A1 | 7/2013 | Utsch et al. |
| 2013/0199989 A1 | 8/2013 | Carter et al. |
| 2013/0233890 A1 | 9/2013 | Melzer |
| 2013/0239528 A1 * | 9/2013 | Coulonvaux ...... B01D 46/0005 55/482 |
| 2013/0319927 A1 | 12/2013 | Lin |
| 2014/0014566 A1 | 1/2014 | Mitchell |
| 2014/0151285 A1 | 6/2014 | Cur et al. |
| 2015/0166364 A1 | 6/2015 | Wiegele |
| 2016/0167980 A1 * | 6/2016 | Dani .................... B01D 35/30 210/466 |
| 2016/0376161 A1 | 12/2016 | Dani et al. |
| 2016/0376162 A1 | 12/2016 | Dani et al. |
| 2016/0376163 A1 | 12/2016 | Dani et al. |
| 2016/0376164 A1 | 12/2016 | Dani et al. |
| 2016/0376165 A1 | 12/2016 | Dani et al. |
| 2017/0001880 A1 | 1/2017 | Dani et al. |

FOREIGN PATENT DOCUMENTS

| | | |
|---|---|---|
| CA | 2874153 A1 | 6/2015 |
| CA | 2933185 A1 | 6/2015 |
| EP | 0402661 A1 | 12/1990 |
| EP | 0617951 A2 | 10/1994 |
| GB | 2268680 A | 1/1994 |
| GB | 2284563 A | 6/1995 |
| JP | 657489 U | 8/1994 |
| WO | WO199835738 A1 | 8/1998 |
| WO | WO200701468 A1 | 1/2000 |
| WO | 2011145640 A1 | 11/2011 |
| WO | 2012031853 A1 | 3/2012 |
| WO | 2012150506 A2 | 11/2012 |
| WO | 2013044079 A1 | 3/2013 |
| WO | 2013088260 A1 | 6/2013 |
| WO | 2014089207 A1 | 6/2014 |
| WO | WO2015073144 A1 | 5/2015 |
| WO | WO2015094741 A1 | 6/2015 |
| WO | 2017055914 A1 | 4/2017 |

(56) References Cited

FOREIGN PATENT DOCUMENTS

| WO | 2017055915 A1 | 4/2017 |
|---|---|---|
| WO | 2017055916 A1 | 4/2017 |
| WO | 2017055918 A1 | 4/2017 |

OTHER PUBLICATIONS

International Preliminary Report on Patentability dated Apr. 3, 2018 in corresponding/related International Application No. PCT/IB2016/001472.
International Preliminary Report on Patentability dated Apr. 3, 2018 in corresponding/related International Application No. PCT/IB2016/001474.
International Preliminary Report on Patentability dated Apr. 3, 2018 in corresponding/related International Application No. PCT/IB2016/001479.
International Preliminary Report on Patentability dated Apr. 3, 2018 in corresponding/related International Application No. PCT/IB2016/001495.
International Search Report and Written Opinion dated Feb. 6, 2017 in corresponding/related International Application No. PCT/IB2016/001472.
International Search Report and Written Opinion dated Jan. 26, 2017 in corresponding/related International Application No. PCT/IB2016/001474.
International Search Report and Written Opinion dated Jan. 27, 2017 in corresponding/related International Application No. PCT/IB2016/001479.
International Search Report and Written Opinion dated Jan. 27, 2017 in corresponding/related International Application No. PCT/IB2016/001495.
NPL-1 ("Activated Carbon Filter Bags", Filterek) Date: Jun. 4, 2012.
Oxford Dictionary Definition—coextensive, 2017, 1 page.
Oxford Dictionary Definition—immediately, 2017, 1 page.
Supplementary European Search Report EP 14870910.8, dated Jun. 8, 2017.
Supplementary European Search Report EP 14871227.6, dated Jun. 8, 2017.
Supplementary European Search Report EP 14871467.8, dated Jun. 8, 2017.
Supplementary European Search Report EP 14871701.0 dated Jun. 8, 2017.
Supplementary European Search Report EP 14871914.9, dated Jun. 13, 2017.
Supplementary European Search Report EP 14872175.6, dated Jun. 8, 2017.
Australian Office Action dated Feb. 22, 2018 in corresponding/related Australian Application No. 2014366927.
Australian Office Action dated Mar. 8, 2018 in corresponding/related Australian Application No. 2014366937.
Australian Office Action dated May 25, 2018 in corresponding/related Australian Application No. 2014366492.
Australian Office Action dated Jun. 22, 2018 in corresponding/related Australian Application No. 2014366926.
Office Action dated Mar. 4, 2019 in corresponding/related Australian Application No. 2014366937.
Australian Office Action dated Dec. 20, 2018 in corresponding/related Australian Application No. 2014366927.
Hutton, I.M., 2007, Handbook of Nonwoven Filter Media (1st ed), pp. 96-99.

* cited by examiner

*FIG. 10*

FILTER CORE CONFIGURATION

CROSS-REFERENCE TO RELATED APPLICATIONS

This application is the National Stage of International Application No. PCT/IB2016/001495, filed Sep. 27, 2016, which claims the benefit under 35 U.S.C. 119(e) of U.S. Provisional Application No. 62/235,295, filed Sep. 30, 2015. The disclosure of each of the above applications is incorporated by reference in its entirety. This application is also related to the following United States Patent Applications: U.S. patent application Ser. No. 15/756,713, entitled ACTIVATED CARBON FIBER FILTER MEDIA LAMINATE, which is the National Stage of International Application No. PCT/IB2016/001472, filed Sep. 27, 2016, which claims the benefit under 35 U.S.C. 119(e) of U.S. Provisional Application No. 62/235,289, filed Sep. 30, 2015; U.S. patent application Ser. No. 15/756,768, entitled FILTER DESIGN WITH INTERCHANGEABLE CORE COVER which is the National Stage of International Application No. PCT/IB2016/001479, filed Sep. 27, 2016, which claims the benefit under 35 U.S.C. 119(e) of U.S. Provisional Application No. 62/235,304, filed Sep. 30, 2015; and U.S. patent application Ser. No. 15/756,809, entitled FILTER CARTRIDGE PLACEMENT IN FILTER AS YOU POUR SYSTEM which is the National Stage of International Application No. PCT/IB2016/001474, filed Sep. 27, 2016, which claims the benefit under 35 U.S.C. 119(e) of U.S. Provisional Application No. 62/235,321, filed Sep. 30, 2015. All of the aforementioned applications are filed the same day herewith, and are incorporated herein in their respective entireties by this reference.

FIELD OF THE INVENTION

Embodiments of the present invention generally concern water filtration systems for pitchers and other fluid containers. More particularly, embodiments of the invention relate to a filter core structure configured to support a filter medium.

BACKGROUND

Water filtration has become common in homes, offices and other places to produce cleaner and better tasting water. Accordingly, water containers such as pitchers have been equipped with filtration systems. In some instances, these filtration systems may employ a filter core to which one end of a piece of a filter medium is attached, such as by gluing. The free end of the piece of filter medium is then wrapped around the filter core and secured in place with more glue. The filter core includes various openings that allow unfiltered water to enter the interior of the filter core by passing through the filter medium. As well, the fluid in the filter core may also exit the filter core by passing through the filter medium. Thus, the filter core and filter medium configuration may enable a dual pass—dual filtration process.

The use of a filter core with attached filter medium has proven problematic in some respects however. For example, the filter medium is often attached to the filter core in such a way that a vertical seam is defined at the location where the two ends of the piece of filter medium butt against each other. Typically, the seam is characterized by gaps and/or other imperfections that enable fluid to enter and exit the filter core without passing through the filter medium. This condition is sometimes referred to as bypass, since the unfiltered fluid bypasses the filter medium. Bypass is a concern at least because it compromises the overall effectiveness of the filter. Correspondingly, bypass may also have a negative influence on consumer perception of the effectiveness of the filter.

Another concern with structures such as those described above relates to the methods used to attach the filter medium to the filter core. In particular, some filter products are manufactured by using glue to attach the filter medium to the filter core. The use of glue may complicate the manufacturing process. As well, the use of glue may not be viewed favorably by consumers.

Finally, some filter products require the use of O-rings, clamps and/or other mechanical devices in an attempt to prevent fluid from entering or exiting the filter core at the boundaries of the filter medium. However, the use of mechanical devices such as O-rings and clamps in this way increases the cost and complexity of the design, and may not contribute significantly to avoiding or reducing the bypass problem. Moreover, contact with devices such as O-rings can damage some types of filter media.

In light of problems such as those noted above, it would be useful to provide a filter assembly including a filter medium that is configured and arranged to reduce, or eliminate, bypass problems typically associated with a filter medium that defines a vertical seam when attached to a filter core. As well, it would be useful to provide a filter assembly that can be reliably constructed without the use of glue to attach the filter medium to the filter core. It would also be useful to provide a filter assembly that can be configured without the use of O-rings or other mechanical devices to seal the upper and lower edges of the filter medium so as to avoid or minimize bypass at those locations. Finally, it would be useful to provide a filter assembly that can provide dual, or more, filtration in a single pass of fluid through the filter medium.

ASPECTS OF AN EXAMPLE EMBODIMENT

One or more embodiments within the scope of the invention may be effective in overcoming one or more of the disadvantages in the art. One example embodiment is directed to a filter core that is configured and arranged so that a filter medium, which may take the form of a laminate, can be securely attached to the filter core without the use of glue. One example of such a filter medium is a laminate that includes a layer of activated carbon fiber (ACF) media positioned between two layers of non-woven material which are arranged so that when the laminate is wrapped around a structure such as a filter core for example, one of the non-woven layers is an inner layer, and the other non-woven layer is an outer layer. Each side of the non-woven layers may include an adhesive layer or adhesive material so that the non-woven layers can achieve and maintain substantial contact with the ACF layer, and with each other.

As well, embodiments of the filter core may include annular walls that interface with respective edges of the filter medium to substantially reduce, or prevent, bypass of the filter medium. The filter core can be configured to support multiple wraps of the filter medium and, in one particular example, a filter assembly including the filter core may include a filter medium with a dual wrap configuration. Among other things, the dual wrap, or other multiple wrap, configuration can eliminate seams that may allow bypass. Further reduction or elimination of bypass of the filter medium can be achieved in at least some embodiments without the use of mechanical devices such as O-rings or clamps. As well, the life of the filter medium may be extended because the filter medium does not contact any O-rings or other sealing elements.

Finally, embodiments of the filter core define a relatively large open space which, when combined with the multiple wrap configuration, may enable a dual filtration effect. In particular, fluid entering or exiting the filter core by way of the open space will pass through multiple wraps of the filter medium, and thus be subjected to multiple filtrations. Thus, the effectiveness of the filter assembly that includes the filter core and a filter medium is improved.

The foregoing embodiment is provided solely by way of example and is not intended to limit the scope of the invention in any way. Consistently, various other embodiments of filter assemblies, and associated filter medium and filter cores, within the scope of the invention are disclosed herein.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Reference will now be made in detail to aspects of various embodiments of the present disclosure, examples of which are illustrated in the accompanying drawings. While described in conjunction with these embodiments, it will be understood that they are not intended to limit the disclosure to these embodiments.

In general, embodiments of the invention can be employed in connection with devices, such as fluid containers, where there is a need to filter fluid as, and/or before, the fluid is dispensed from the container. In one particular example, embodiments of the invention can be used in conjunction with a pitcher, although the scope of the invention is not limited to this example environment and extends, more generally, to any environment where such embodiments can be usefully employed. For example, embodiments of the invention can be employed with any water, or other fluid, container, examples of which include, but are not limited to, bottles, carafes, and jugs.

A. EXAMPLE FILTER ASSEMBLY

Figure 1:
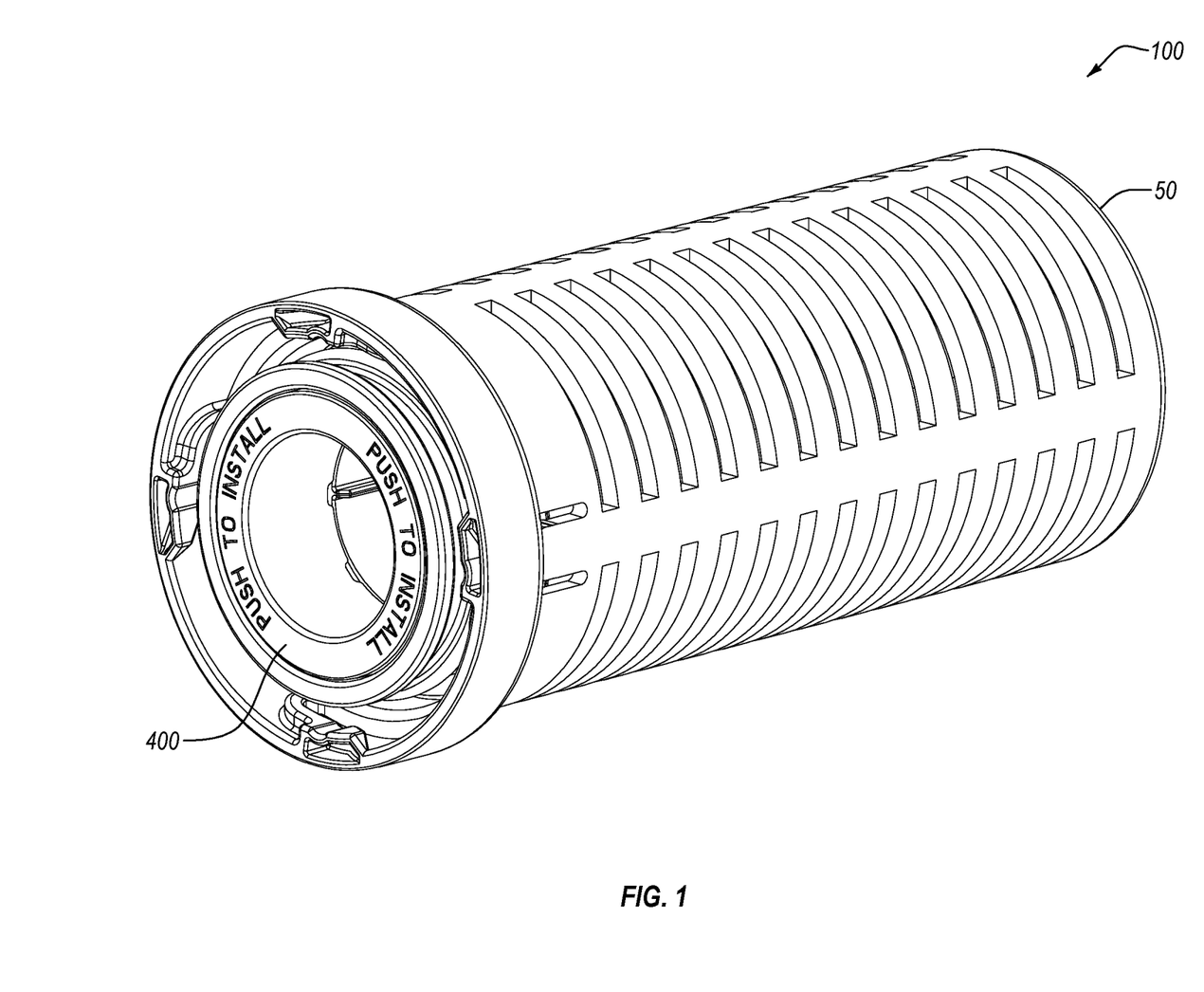
FIG. 1 is a top perspective view of an example embodiment of a filter assembly and associated cage.
Figure 2:
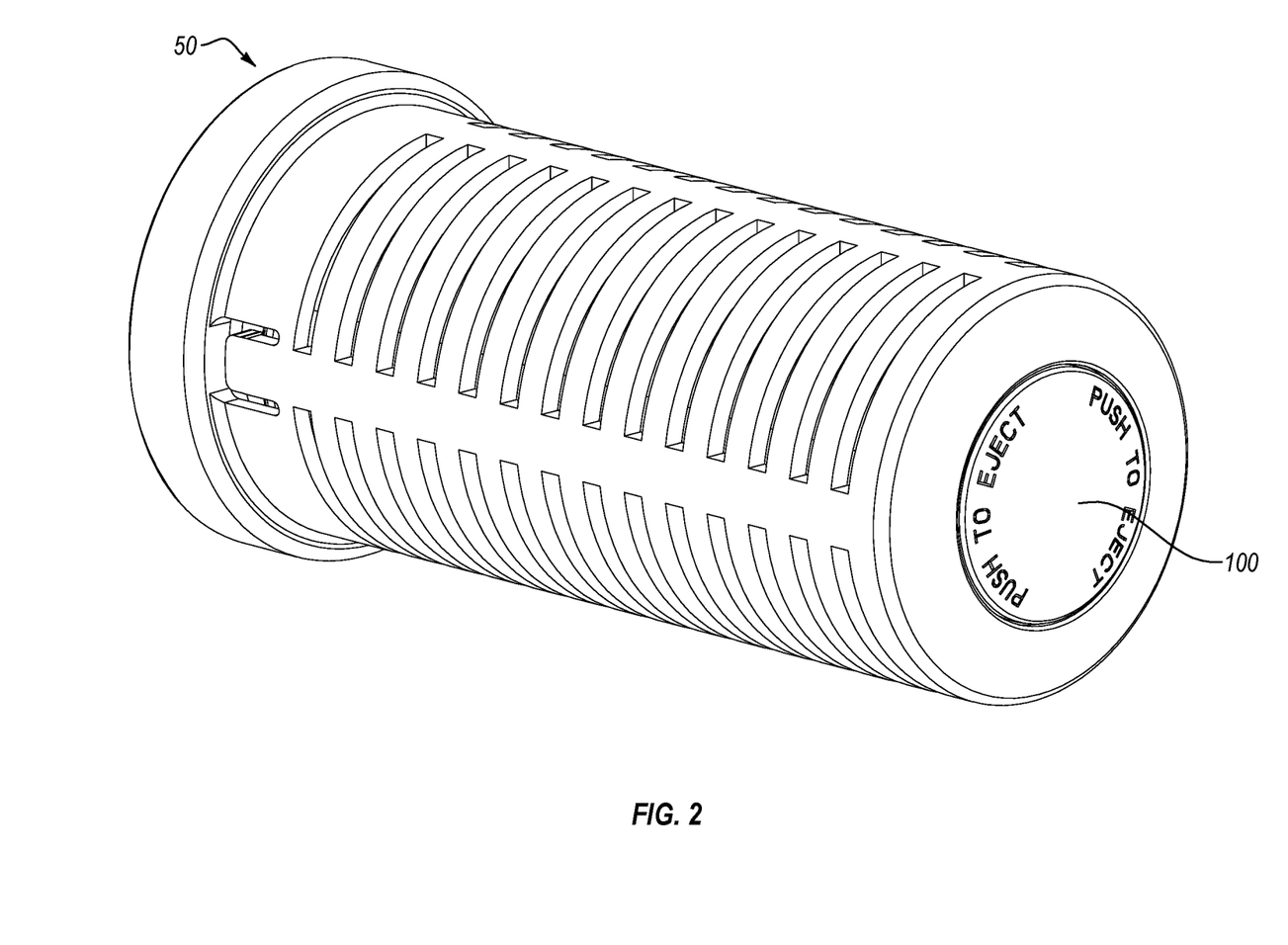
FIG. 2 is a bottom perspective view of an example embodiment of a filter assembly and associated cage.
Figure 3:
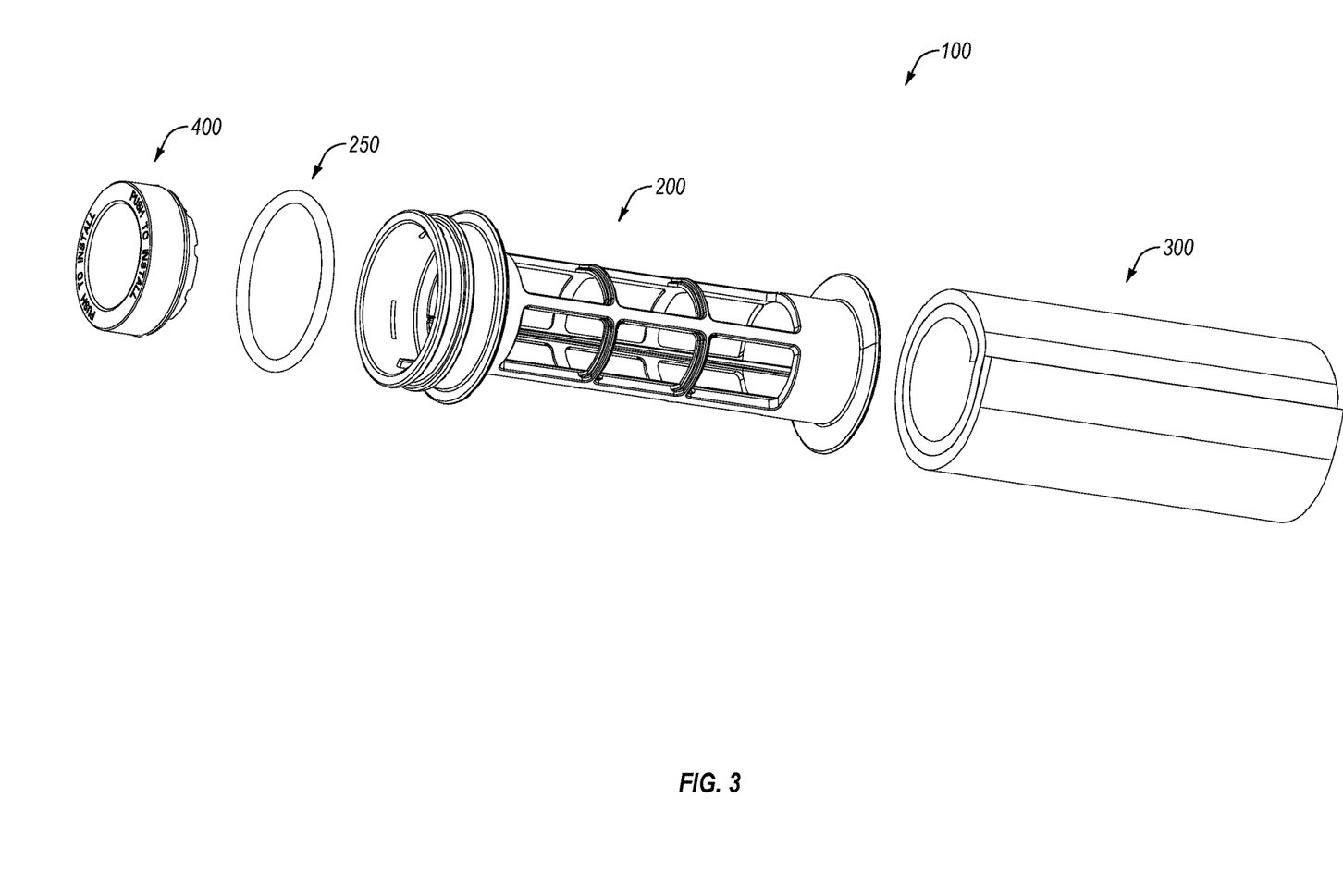
FIG. 3 is an exploded view of the example filter assembly of FIG. 1.
Figure 4:
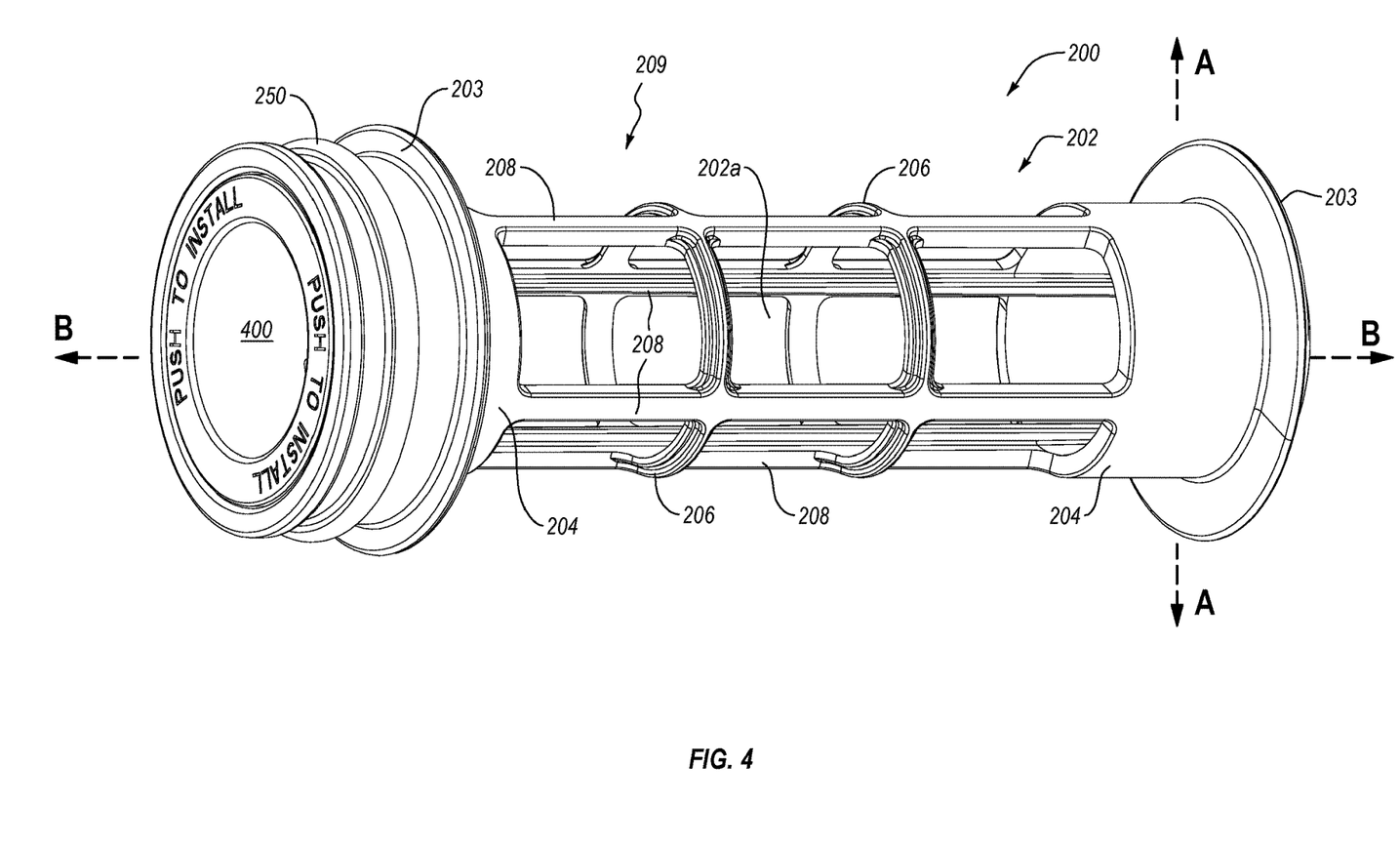
FIG. 4 is a top perspective view of an example filter core including a flow regulator.
Figure 5:
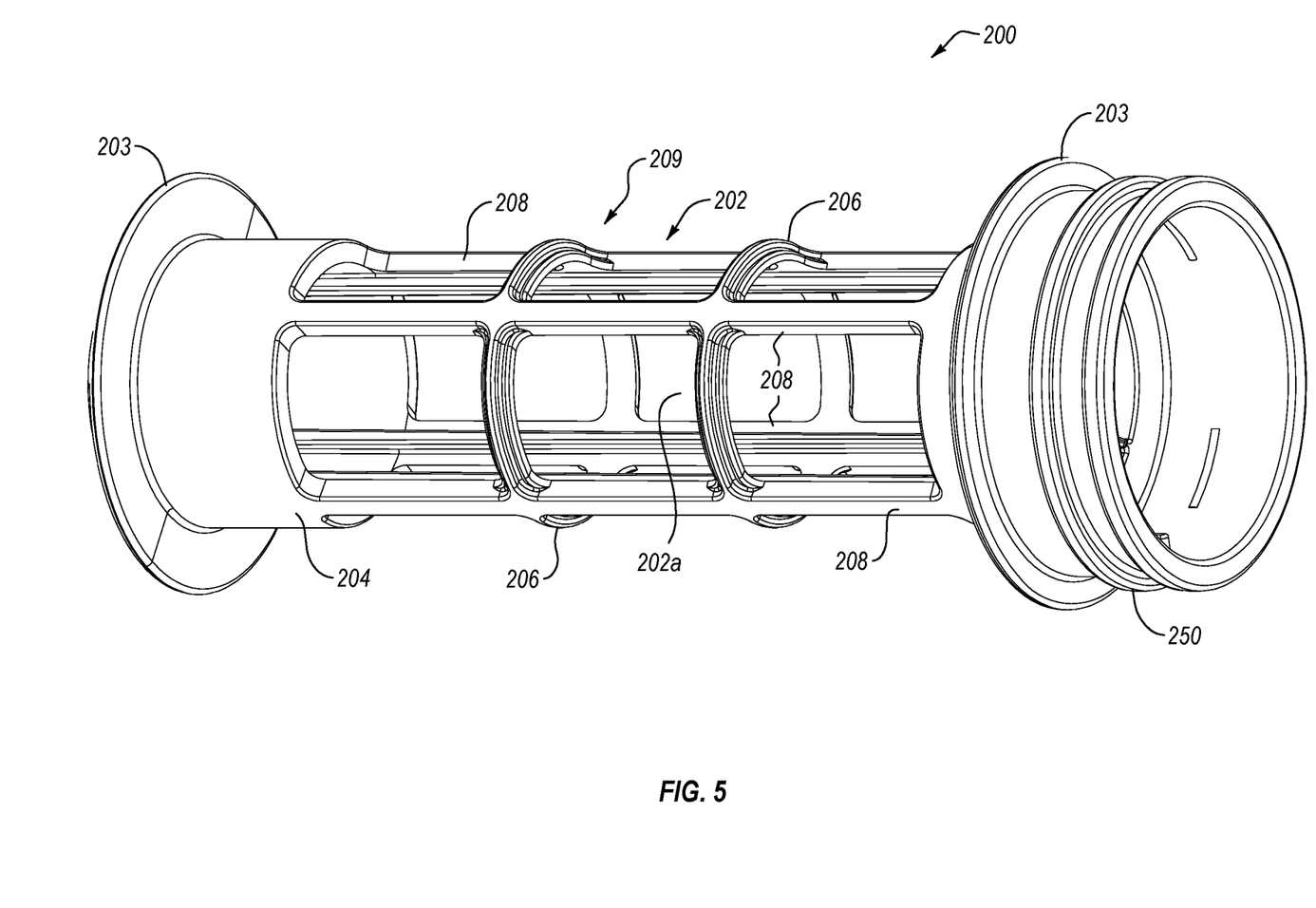
FIG. 5 is a top perspective view of an example filter core with the flow regulator of FIG. 4 omitted.
Figure 6:
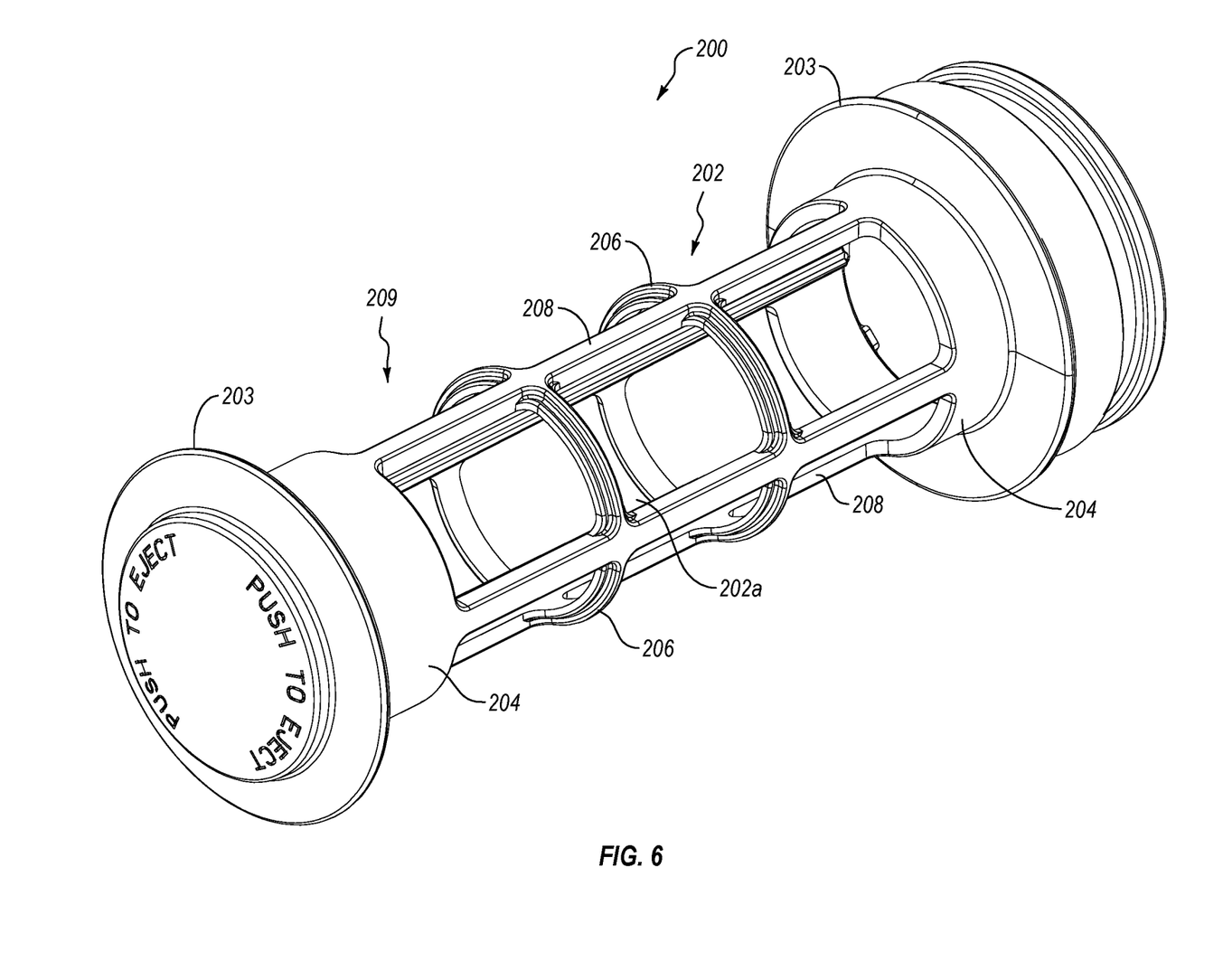
FIG. 6 is a bottom perspective view of an example filter core.
Figure 7:
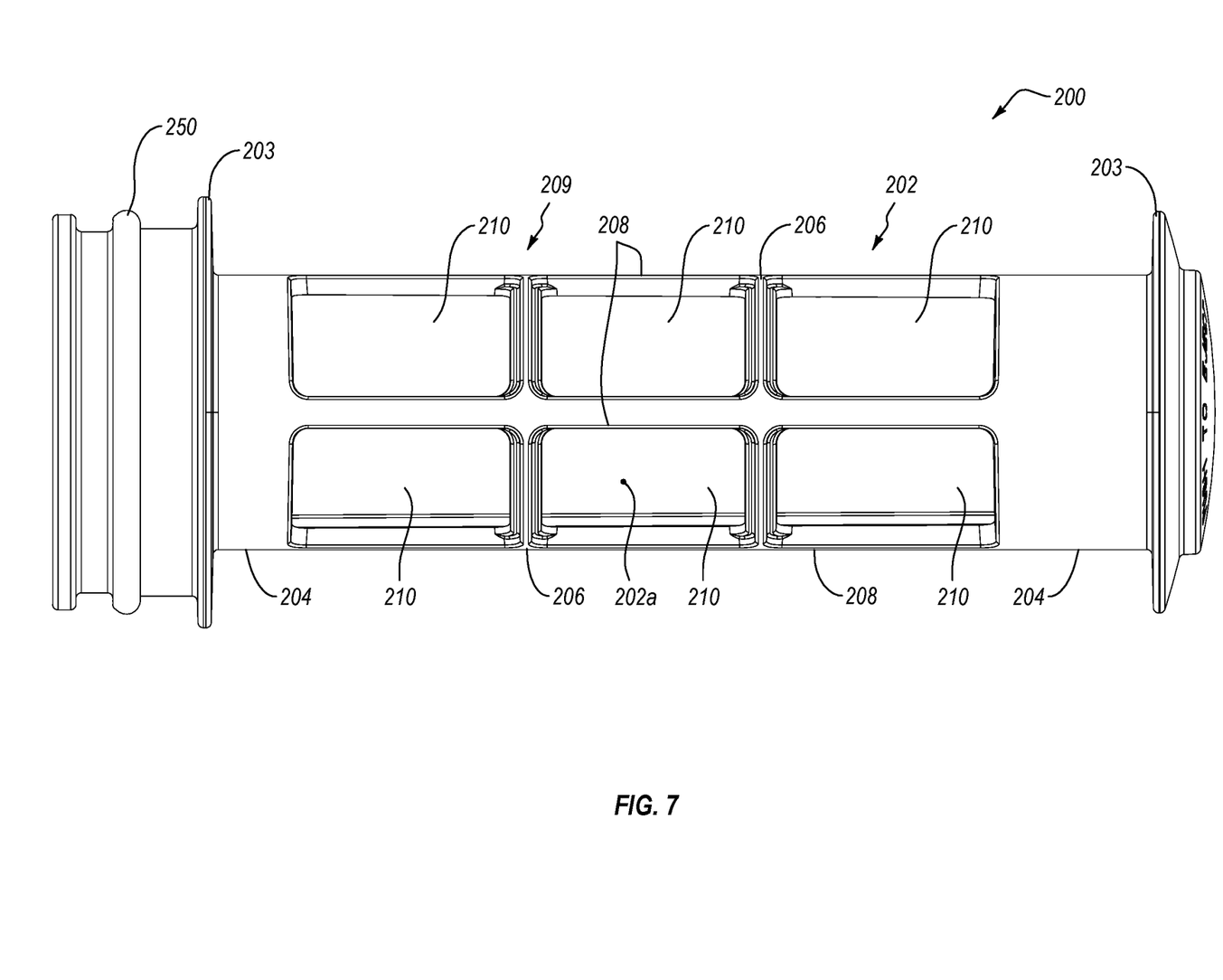
FIG. 7 is a side view of the example filter core of FIG. 3.

Directing attention now to FIGS. 1-3, details are provided concerning a filter assembly, one example of which is denoted generally at 100. Embodiments of the filter assembly 100 can be employed in connection with a cage 50 that may be a removable element of a fluid container, such as the example fluid containers disclosed herein. In general, the filter assembly 100 can be releasably engaged with the cage 50, and the cage 50 then connected to the fluid container. In the particular example of FIGS. 1 and 2, the filter assembly 100 can be configured to releasably engage the cage 50 in a push fit or snap fit arrangement. As such, the filter assembly 100 can include structures (not shown) that can be releasably engaged with corresponding structure(s) (not shown) of the cage 50 by pushing the filter assembly 100 into the cage 50 until the filter assembly 100 snaps or locks into the cage 50. Likewise, the filter assembly 100 can be removed from the cage 50 by pushing the filter assembly 100 at a location near the bottom of the cage 50, as suggested in FIG. 2. The scope of the invention is not limited to the foregoing example however, and any other structure(s) that enable releasable engagement of the cage 50 and the filter assembly 100 with each other can be used.

As best shown in FIG. 3, the example filter assembly 100 includes a filter core 200 that may include one or more sealing elements 250, such as an O-ring for example, that seals the filter core 200 to the fluid container (not shown) when the filter core 200 and fluid container are engaged with each other, so as to prevent bypass of unfiltered fluid past the filter core 200 and out of the fluid container. In the example of FIG. 3, the filter assembly 100 further includes a filter medium 300 attached to the filter core 200. In particular, the filter medium 300 can be wrapped around the filter core 200 to form multiple stacked layers, as shown in FIG. 3, and in FIG. 9 discussed below. Some examples of a filter medium 300 that can be used in connection with embodiments of the filter core 200 are disclosed in U.S. patent application Ser. No. 15/756,713, entitled ACTIVATED CARBON FIBER FILTER MEDIA LAMINATE, and identified in the 'Related Applications' section of this disclosure. The scope of the invention is not limited to the use of such a filter medium however.

With continued reference to FIGS. 1 and 3, the filter assembly 100 further includes a core cover 400. In general, and as disclosed in detail in 'Related Application' U.S. patent application Ser. No. 15/756,768, entitled FILTER DESIGN WITH INTERCHANGEABLE CORE COVER, the core cover 400 can define a flow control opening 402 that enables control of the flow rate of fluid out of the filter assembly 100. The core cover 400 can be removably attached to the filter core 200 in any suitable way, such as with threads, a snap-fit arrangement, or any other type of respective complementary structures. Some example complementary structures of a filter core and core cover are disclosed in the aforementioned 'Related Application.'

B. EXAMPLE FILTER CORE

With particular attention now to FIGS. 3-7, details are provided concerning example embodiments of a filter core, such as the filter core 200. In general, the filter core 200 can be made of any suitable material, or materials. Example embodiments of the filter core 200 are made of chemically inert materials. In at least some embodiments, the filter core 200 is substantially, or completely, made of plastic. Moreover, the filter core 200 may have a unitary, single-piece construction. As well, the filter core 200 can be constructed using any suitable production process(es), one example of which is injection molding.

As shown in FIGS. 3-7, the filter core 200 includes a body 202 with a generally cylindrical shape and defining a hollow interior 202a through which fluid can flow. It should be noted that the scope of the invention is not limited to any particular body shape however. The body 202 includes flanges 203 that extend out in a radial direction 'AA' from the body 202 near the upper and lower ends of the body 202 so as to define a spool-like configuration of the body 202. Among other things, the flanges 203 can help to retain filter medium 300 on the body 202.

In addition to the flanges 203, the body 202 further includes upper and lower annular walls 204 that extend axially along the body 202 near the upper and lower ends of the body 202. The annular walls 204 may have about the same, or the same, diameter as each other, and the annular walls 204 can also have the same height, although that is not required and either of the annular walls 204 can be higher than the other annular wall 204. The height of the annular walls 204, as measured in an axial direction 'BB' of the body 202, can reflect a balance of considerations, such as the need to make efficient use of the filter medium 300 by maximizing the area of the filter medium 300 that is available for fluid to freely flow through, while also providing sufficient annular wall 204 height to enable the filter medium 300 to seal against the body 202 and prevent bypass (see, e.g., FIG. 8).

The example body 202 further includes a series of annular elements 206, each of which can be generally in the form of a ring. The annular elements 206 are spaced apart from each other and arranged along the axis 'BB' of the body 202. The annular elements 206 can be uniformly spaced apart from each other, or may be spaced apart from each other at non-uniform interval lengths. In the illustrated embodiment, two annular elements 206 are provided, although more or fewer annular elements 206 can be employed in other embodiments. The annular elements 206 can have any suitable configuration. In one example embodiment, one or more of the annular elements 206 each have a generally T-shaped cross-section shape, although other shapes such as circular or oval for example, could alternatively be employed. In the illustrated embodiment, the T-shape is configured and arranged such that the bottom portion of the T-shape extends away from the interior 202a of the body 202.

With continued reference to the Figures, the annular elements 206 are connected to axial elements 208 that extend along a substantial portion of the overall length of the body 202. The axial elements 208 are spaced apart from each other and arranged about the diameter of the body 202. The axial elements 208 can be uniformly spaced apart from each other, or may be spaced apart from each other at non-uniform interval lengths. In the illustrated embodiment, four axial elements 208 are provided, although more or fewer axial elements 208 can be employed in other embodiments. Similar to the case of the annular elements 206, the axial elements 208 can have any suitable configuration. In one example embodiment, one or more of the axial elements 208 each have a generally T-shaped cross-section shape, although other shapes such as circular or oval for example, could alternatively be employed. In the illustrated embodiment, the T-shape is configured and arranged such that the bottom portion of the T-shape extends towards the interior 202a of the body 202.

With regard to both the annular elements 206 and axial elements 208, such a T-shaped configuration may contribute to the strength and rigidity of the body 202. In general however, the scope of the invention is not limited to any particular configuration(s) of the annular elements 206 or axial elements 208.

As is apparent from FIGS. 3-7 the annular elements 206 and axial elements 208 comprise elements of a framework 209 having a plurality of openings 210 through which fluid is able to flow into and/or out of the interior 202a of the body 202. In the illustrated embodiment, a total of 12 openings 210 are provided, although more or fewer openings could be used. In general, the openings 210 collectively define the total amount of open space provided by the filter core 200. In one particular embodiment, a filter core 200 may have an open space in the range of about 3000 mm² to about 4000 mm², and in yet another example embodiment, a filter core 200 may have an open space of about 3500 mm². However, the scope of the invention is not limited to any particular amount, or range of amounts, of open space.

In any case, the amount of open space can be defined by including more or fewer annular elements 206 and/or more or fewer axial elements 208 in the body 202, and the size of the openings 210 can be defined in a like manner. In the illustrated example, the openings 210 each have about the same size. In other embodiments, the openings 210 can have a variety of different sizes. Further, while the openings 210 are indicated in the example embodiment as generally rectangular in shape, other shapes can alternatively be employed, such as a polygonal shape with 'n' or more sides, where 'n' is 3 or greater.

C. EXAMPLE FILTER CORE/FILTER MEDIUM CONFIGURATION

Figure 8:
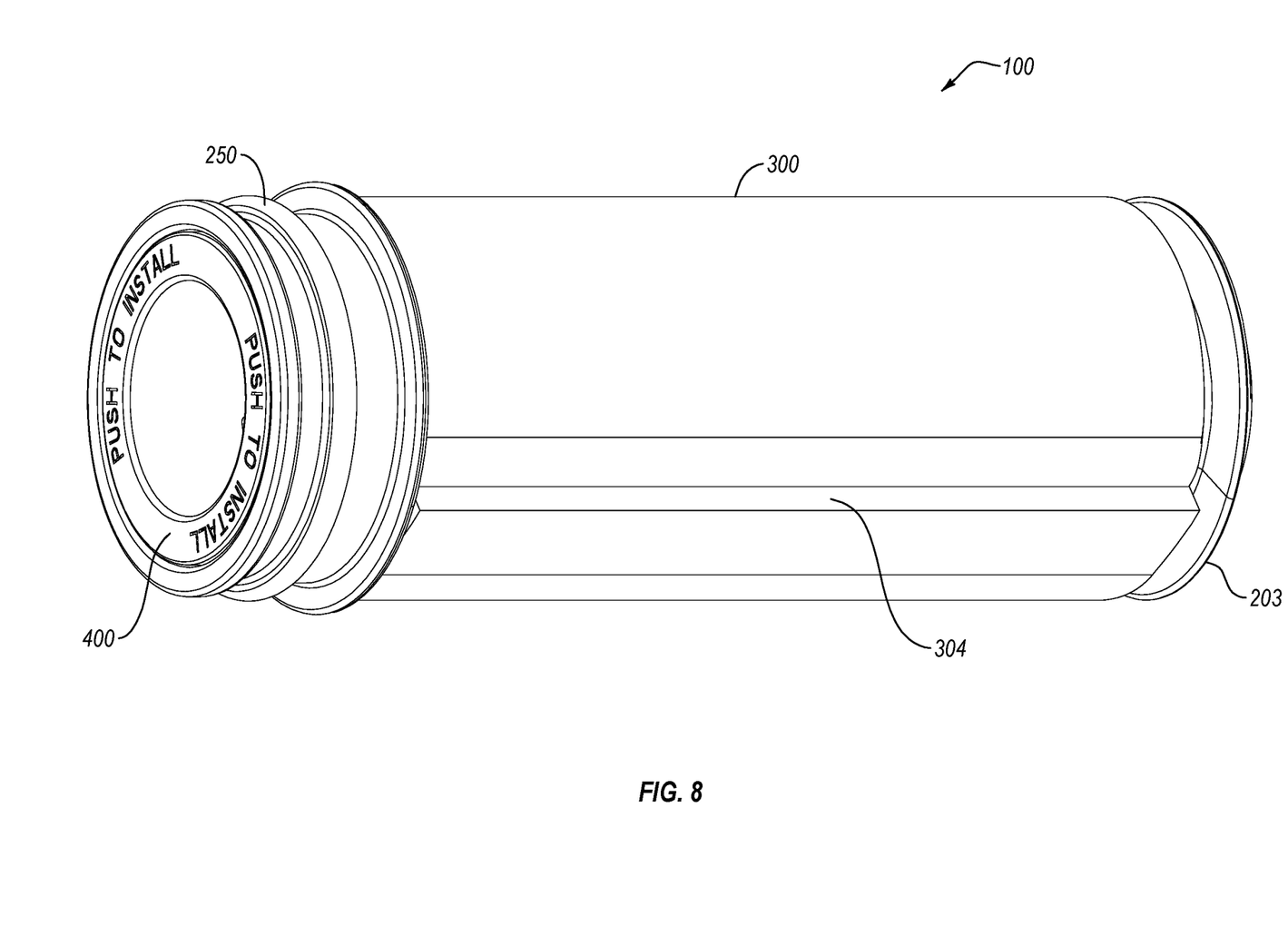
FIG. 8 is a top perspective view of an example filter core assembly including a wrapped filter medium.
Figure 9:
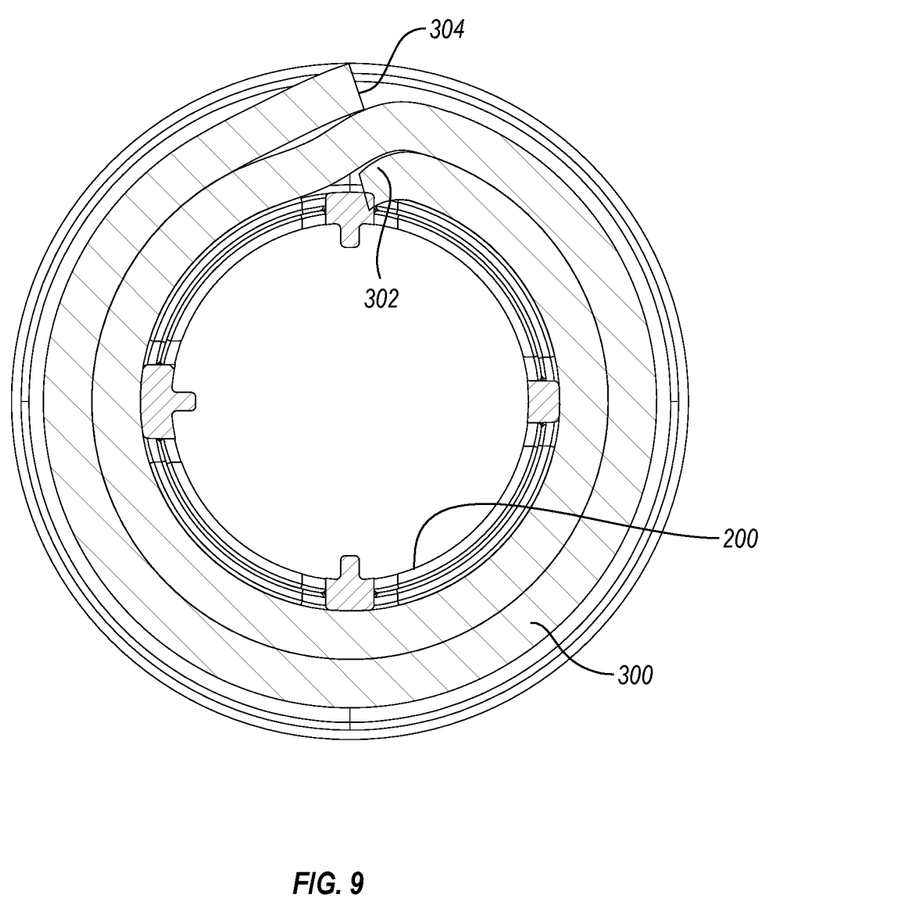
FIG. 9 is a section view of the example assembly of FIG. 8 and discloses a filter medium wrapped around the filter core.

Directing attention now to FIGS. 8 and 9, and with continuing reference to FIGS. 3-7, further details are provided concerning the use of a filter medium, such as filter medium 300, in connection with a filter core, such as the filter core 200. As shown in FIGS. 8 and 9, a first end 302 of the filter medium 300 can be attached to the filter core 200, such as by heat staking using a heat-activated adhesive for example. In particular, the heat-activated adhesive can take the form of a layer disposed on the underside of the filter medium 300 such that when the filter medium 300 and/or the filter core 200 is heated, the underside of the filter medium 300 will adhere to the filter core 200, as shown. After the first end 302 of the filter medium 300 is attached to the filter core body 202, the filter medium 300 is then wrapped around the filter core 200 and the free end 304 of the filter medium 300 attached, such as with a heat-activated adhesive for example, to an exposed portion of the filter medium 300.

As best shown in FIG. 9, the filter medium 300 can be wrapped so that the free end 304 overlaps the first end 302 in such a way that there is at least a double wrap of filter medium 300 at all locations around the filter core body 202. One advantage of this arrangement is that any fluid entering or exiting the interior 202a of the filter core 200 must pass through two layers of filter medium 300 before the fluid can enter/exit the filter core 200. Thus, dual filtration of the fluid is provided in a single pass of the fluid. Moreover, the double wrap configuration enables the inner layer of filter medium 300 to act as a seal for the outer layer(s) of the filter medium 300 and thus helps to prevent bypass of the filter medium 300. As also shown in FIG. 9, the free end 304 is arranged relative to the first end 302 such that there is a triple thickness of filter medium 300 on at least part of the circumference of the filter core body 202. One useful aspect of such an arrangement is that there are no end-to-end seams of the filter medium 300 through which unfiltered fluid could pass.

With continuing reference to both FIGS. 8 and 9, the filter medium can be configured and arranged such that the outside diameter of the thickest portion of the filter medium 300, namely, where the filter medium 300 is triple stacked, is about the same as, or slightly more or less than, the outside diameter of the flanges 203. This configuration may be advantageous in that the filter medium 300 is able to seal off the flanges 203 and annular walls 204, without the use of glue to attach the filter medium 300 to the filter core body 202, so that no unfiltered fluid can pass through the areas where the filter medium 300 contacts the flanges 203 and annular walls 204. As well, by keeping the height of the annular walls 204 in the axial direction 'BB' as low as possible (see, e.g., FIG. 4), while maintaining the aforementioned sealing functionality, the amount of filter medium 300 that is blocked by the annular walls 204 is kept to a minimum, thus enabling efficient use of the surface area of the filter medium 300.

Finally, a filter medium such as disclosed in the 'Related Application' identified herein may be particularly well suited for use with the filter core 200. For example, such a filter medium can be relatively thin and thus easily configured in double, or thicker, layer arrangements. As noted herein, such multiple layer arrangements can provide relatively better filtration than can be achieved by single layer configurations. Moreover, the multiple layer configuration may be characterized by a relatively flatter contamination reduction curve. By way of illustration, the filtering effectiveness of a single layer of a filter medium may decline relatively more rapidly, as a function of flow rate, than the filtering effectiveness of a multiple layer configuration. Thus, in one particular example, the percentage of chlorine (Cl) reduction provided by a single layer of a filter medium may decrease from 95% at no, or zero, flow to about 75% at 40 gallons per minute (gpm), while the percentage of Cl reduction provided by a double layer of the same filter medium may remain above about 90% at the same flow rate, namely, about 40 gpm. As this example illustrates, relatively good flow rates and filtration performance can thus be achieved with a multiple layer configuration such as disclosed in FIG. 9, and this is particularly so where the filter medium 300 takes the form of an ACF laminate. In at least some embodiments, the filter medium 300 is of a type and configuration that meets or exceeds National Sanitation Foundation (NSF) standards for chlorine.

In terms of the selection of a filter medium, such as filter medium 300, for use with the filter core 200, there may be a variety of parameters involved. For example, a variety of parameters can be inherently defined by the filter medium, such as the basis weight, thickness, fiber diameter, surface activity, density, and pore volume distribution. These parameters can form the basis for derivation of other filter medium considerations such as any pre-treatment or post-treatment that may be necessary for the fluid passing through the filter medium.

D. EXAMPLE PRODUCTION PROCESSES

Figure 10:
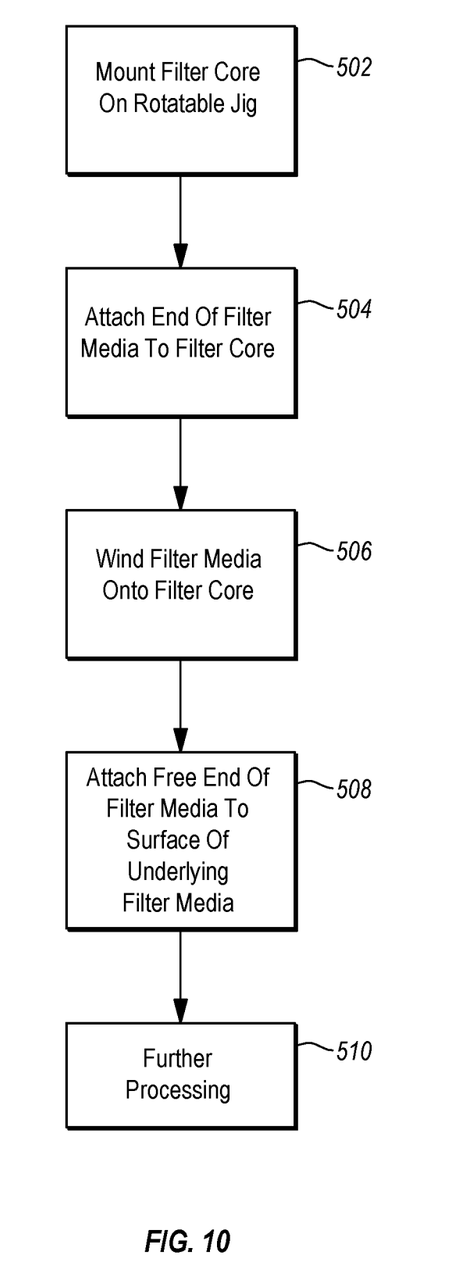
FIG. 10 is a flow diagram disclosing aspects of an example production process for a filter assembly that includes a filter core and a filter medium.

With attention now to FIG. 10, details are provided concerning processes for manufacturing a filter assembly, one example of which is the filter assembly 100 discussed above. One example of a process for manufacturing a filter assembly is denoted generally at 500. Initially, a filter core, such as filter core 200, is placed 502 on a device such as a rotatable jig. A first end of a filter medium, such as filter medium 300 or, in some more particular embodiments, an ACF laminate, is then attached 504 to the filter core. In at least some embodiments, the first end of the filter medium that is attached to the filter core takes the form of a wing made of a non-woven material and that includes an adhesive layer on some, or all, of the lower surface of the wing.

Where the filter medium is an ACF laminate, or other filter medium that includes an adhesive layer, the first end of the filter medium can be fixed, or heat staked, to the filter core by a heat pressing process. The heat pressing process can be implemented by a heating element, such as a heated bar for example, that extends axially along the filter core and is pressed downward in a radial direction onto the first end of the filter medium, thus heating the adhesive layer on the first end of the filter medium so that the filter medium becomes attached to the filter core. Because the attachment process 504 does not use glue or a separate gluing process, the filter medium can be quickly, easily and reliably attached to the filter core.

After the first end of the filter medium has been attached 504 to the filter core, the rotatable jig is then rotated so as to wind 506 multiple layers of a filter medium onto the filter core. In some embodiments, the filter medium is sufficiently long enough that when the filter medium is wound 506 onto the filter core, there is at least a double thickness of the filter medium at all locations about the circumference of the filter core, and a triple thickness of the filter medium about a portion of the circumference of the filter core. See, e.g., FIG. 9. As the filter medium is wound 506 onto the filter core, the filter medium can be subjected to tension to help avoid the occurrence of wrinkles or folds in the filter medium.

When the winding 506 of the filter medium onto the filter core has been completed, the free end of the filter medium can be fixed 508, or heat staked, to the surface of the filter medium that has already been wound onto the filter core and that lies underneath the free end of the filter medium. In at least some embodiments, the free end of the filter medium takes the form of a wing made of a non-woven material and including an adhesive layer on some, or all, of the lower surface of the wing.

The attachment 508 of the free end of the filter medium may be performed using a heat pressing process. The heat pressing process can be implemented by a heating element, such as a heated bar for example, that extends axially along the filter core and is pressed downward in a radial direction onto the free end of the filter medium, thus heating the adhesive layer on the free end of the filter medium so that the free end of the filter medium becomes attached to the surface of the underlying filter medium. See, e.g., FIGS. 8 and 9. Where the filter medium takes the form of an ACF laminate, the attachment 508 of the free end of the filter medium to the underlying wrapped filter medium involves the attachment of a non-woven material, which has an adhesive layer on its underside, to a top surface of a non-woven material.

After the free end of the filter medium has been attached 508, the completed filter assembly can then be further processed 510. For example, the filter assembly can be packaged for sale and use as an after-market replacement part. Other completed filter assemblies can be installed in a cage (such as cage 50—FIG. 1), of a fluid container, for sale as part of a package or assembly that includes the fluid container.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed:

1. A filter core, comprising:
a body extending along a longitudinal axis having a cylindrical shape that defines a hollow interior, the body comprises:
a first annular wall disposed proximate a first end of the body;
a second annular wall disposed proximate a second end of the body such that the second annular wall is axially spaced apart along the longitudinal axis from the first annular wall, and the second annular wall and the first annular wall extending axially toward each other; and
a framework connected to the first annular wall and the second annular wall, wherein the framework includes a plurality of elements, the plurality of elements and the first and second annular walls cooperate with each other to define a group of openings,
wherein each of the openings in the group of openings communicates with the hollow interior of the body, and wherein the openings collectively define an open space of the filter core,
wherein the plurality of elements of the framework comprises:
a plurality of annual elements spaced apart from each other and arranged along the longitudinal axis; and
a plurality of axial elements spaced apart from each other and arranged along the longitudinal axis about a diameter of the body, each of the axial elements connected to one or more of the annular elements;
wherein each of the axial elements has a transverse cross-section that is transverse to the longitudinal axis that has a T-shape and that has a first end connected to the first annular wall, and a second end connected to the second annular wall, wherein a bottom portion of the T-shape extends toward the hollow interior of the body;
wherein each of the annular elements has a transverse cross-section that is parallel to the longitudinal axis that has a T-shape, wherein a bottom portion of the T-shape extends away from the hollow interior of the body;
wherein the T-shape of the plurality of axial elements and the plurality of annular elements are configured to provide strength and rigidity to the body.

2. The filter core as recited in claim 1, wherein the body has a unitary, single-piece construction.

3. The filter core as recited in claim 1, wherein the body is closed at the first end and open at the second end.

4. The filter core as recited in claim 1, wherein the body includes a complementary structure configured to releasably engage a corresponding complementary structure of a core cover to provide a snap-fit engagement.

5. The filter core as recited in claim 1, wherein each of the axial elements is connected to each of the annular elements.

6. The filter core as recited in claim 1, wherein the filter core is configured in the shape of a spool.

7. The filter core as recited in claim 1, further comprising:
a first flange connected to the first annular wall; and
a second flange connected to the second annular wall;
wherein the first and second flanges extend radially out from the respective first and second annular walls.

8. A filter assembly, comprising:
a filter core extending along a longitudinal axis, comprising:
a body having a cylindrical shape that defines a hollow interior, the body comprises:
a first solid annular wall disposed proximate a first end of the body;
a second solid annular wall disposed proximate a second end of the body such that the second solid annular wall is axially spaced apart from the first solid annular wall, and the second solid annular wall and the first solid annular wall extending axially toward each other; and
a framework connected to the first solid annular wall and the second solid annular wall, wherein the framework and the first and second solid annular walls cooperate with each other to define a group of openings,
wherein each of the openings in the group of openings communicates with the hollow interior of the body, and wherein the openings collectively define an open space of the filter core; and
a filter medium wrapped around the filter core;
wherein the framework includes a plurality of axial elements and a plurality of annular elements;
wherein the plurality of annular elements are spaced apart from each other and arranged along the longitudinal axis and the plurality of axial elements are spaced apart from each other and arranged about the plurality of annular elements along the longitudinal axis;
wherein each annular elements has a transverse cross-section that is parallel to the longitudinal axis that has a T-shape with a bottom of the T-shape extending away from the hollow interior of the body.

9. The filter assembly as recited in claim 8, wherein the filter medium is in contact with the framework, the first annular wall, and the second annular wall so that no unfiltered fluid can pass through an area where the filter medium contacts the first and second solid annular walls.

10. The filter assembly as recited in claim 8, wherein the filter medium is configured and arranged such that fluid entering and/or exiting the interior of the filter core must pass through two layers of the filter medium.

11. The filter assembly as recited in claim 8, wherein the filter medium is configured and arranged such that there is a double wrap of the filter medium at all locations about the body of the filter core.

12. The filter assembly as recited in claim 8, wherein the filter medium is configured and arranged such that there is a triple wrap of the filter medium at one location on the body of the filter core.

13. The filter assembly as recited in claim 8, wherein the filter medium includes a first end that is axially attached to the body of the filter core, the filter medium further including a second end, and the filter medium is wrapped about the body of the filter core such that the second end overlaps the first end and is axially attached to the filter medium.

14. The filter assembly as recited in claim 8, wherein the filter medium takes the form of a multi-layer laminate.

15. The filter assembly as recited in claim 8, wherein the filter medium comprises:
a first non-woven layer that is attached to the body;
a second non-woven layer; and
an activated carbon fiber (ACF) layer disposed between, and attached to, the first non-woven layer and the second non-woven layer such that the ACF layer, the first non-woven layer, and the second non-woven layer collectively form a laminate.

16. The filter assembly as recited in claim 8, wherein the filter assembly further comprising: a first flange connected to the first annular wall; and a second flange connected to the second annular wall.

17. The filter assembly as recited in claim 8, further comprising:
- a sealing element disposed proximate the second end of the body, and the sealing element disposed such that there is no contact between the sealing element and the filter medium; and
- a core cover configured and arranged for fluid communication with the interior of the filter core.

18. A fluid container, comprising:
- a fluid reservoir;
- a cage; and
- the filter assembly of claim 8 disposed in the cage and arranged for fluid communication with the fluid reservoir.

19. The filter assembly, as recited in claim 8, wherein each axial element has a transverse cross-section that is transverse to the longitudinal axis that has a T-shape with a bottom of the T-shape extending toward the hollow interior of the body and opposite the T-shape of each annular element.

* * * * *